United States Patent
Lemoine et al.

(10) Patent No.: US 10,047,623 B2
(45) Date of Patent: Aug. 14, 2018

(54) COMPLIANT SEAL ASSEMBLY AND METHOD OF OPERATING

(71) Applicant: United Technologies Corporation, Hartford, CT (US)

(72) Inventors: Jonathan Lemoine, Vernon, CT (US); Steven D. Porter, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 159 days.

(21) Appl. No.: 14/938,447

(22) Filed: Nov. 11, 2015

(65) Prior Publication Data

US 2016/0177764 A1 Jun. 23, 2016

Related U.S. Application Data

(60) Provisional application No. 62/093,195, filed on Dec. 17, 2014.

(51) Int. Cl.

| F01D 11/00 | (2006.01) |
| F16J 15/44 | (2006.01) |
| F16J 15/16 | (2006.01) |
| F16J 15/56 | (2006.01) |
| F16J 9/12 | (2006.01) |
| F02C 7/28 | (2006.01) |
| F01D 9/06 | (2006.01) |
| F01D 25/16 | (2006.01) |

(52) U.S. Cl.
CPC ............ *F01D 11/005* (2013.01); *F01D 9/065* (2013.01); *F01D 11/003* (2013.01); *F01D 25/162* (2013.01); *F16J 15/441* (2013.01); *F02C 7/28* (2013.01); *F05D 2240/58* (2013.01); *F16J 9/12* (2013.01); *F16J 15/164* (2013.01); *F16J 15/56* (2013.01)

(58) Field of Classification Search
CPC ........ F01D 11/003; F01D 11/005; F02C 7/28; F05C 2240/55; F05C 2240/581; F16J 15/164; F16J 15/441; F16J 15/56; F16J 9/00; F16J 9/12; F05D 2240/55; F05D 2240/581

See application file for complete search history.

(56) References Cited

U.S. PATENT DOCUMENTS

| 3,743,303 A | * | 7/1973 | Pope | ........................ F01D 11/00 |
| | | | | 277/422 |
| 4,161,317 A | * | 7/1979 | Sakamaki | .............. F16J 15/441 |
| | | | | 277/428 |

(Continued)

*Primary Examiner* — Nicholas L Foster
(74) *Attorney, Agent, or Firm* — O'Shea Getz P.C.

(57) ABSTRACT

A compliant seal assembly that may be for an MTF of a gas turbine engine includes a housing orientated about an axis with a circumferentially extending groove in the housing opened radially outward. An annular carrier of the assembly is constructed and arranged to move radially within the groove, and includes a circumferentially extending channel that is opened radially outward for receipt of a piston ring that may seal to a surrounding cylindrical wall. In operation, the carrier moves radially with respect to the housing to compensate for radial displacement between the housing and the wall, and the piston ring moves axially along the wall to compensate for axial displacement between the housing and the wall.

11 Claims, 4 Drawing Sheets

(56) References Cited

U.S. PATENT DOCUMENTS

| | | | | |
|---|---|---|---|---|
| 4,494,760 A * | 1/1985 | Spargo | B63H 23/321 | |
| | | | 277/580 | |
| 4,572,518 A * | 2/1986 | Spargo | B63H 23/321 | |
| | | | 277/580 | |
| 4,615,261 A * | 10/1986 | Meijer | F02G 1/0535 | |
| | | | 277/471 | |
| 5,411,298 A * | 5/1995 | Pollack | F16J 15/164 | |
| | | | 285/106 | |
| 6,308,958 B1 * | 10/2001 | Turnquist | F01D 11/02 | |
| | | | 277/347 | |
| 8,668,448 B2 | 3/2014 | Farah et al. | | |
| 8,863,531 B2 | 10/2014 | Scott et al. | | |
| 8,992,173 B2 | 3/2015 | Farah et al. | | |
| 9,194,252 B2 | 11/2015 | Farah et al. | | |
| 9,217,371 B2 | 12/2015 | Farah et al. | | |
| 9,222,413 B2 | 12/2015 | Farah et al. | | |
| 9,470,103 B2 * | 10/2016 | Pirker | F01D 9/065 | |
| 9,618,005 B2 * | 4/2017 | Segawa | F01D 11/005 | |
| 2008/0106040 A1 * | 5/2008 | Zielke | F01D 11/003 | |
| | | | 277/315 | |
| 2011/0283883 A1 * | 11/2011 | Okuma | F16B 15/1452 | |
| | | | 92/172 | |
| 2014/0093368 A1 | 4/2014 | Scott et al. | | |
| 2014/0102110 A1 | 4/2014 | Farah et al. | | |
| 2014/0161607 A1 * | 6/2014 | Pirker | F01D 9/065 | |
| | | | 415/208.1 | |
| 2015/0056067 A1 * | 2/2015 | Segawa | F01D 11/005 | |
| | | | 415/167 | |
| 2015/0233295 A1 | 8/2015 | Farah et al. | | |
| 2015/0260057 A1 | 9/2015 | Farah et al. | | |
| 2015/0377048 A1 | 12/2015 | Farah et al. | | |
| 2016/0024952 A1 | 1/2016 | Farah et al. | | |
| 2016/0032746 A1 | 2/2016 | Jenkins et al. | | |

* cited by examiner

COMPLIANT SEAL ASSEMBLY AND METHOD OF OPERATING

This application claims priority to U.S. patent application Ser. No. 62/093,195 filed Dec. 17, 2014.

BACKGROUND

The present disclosure relates to a seal assembly, and more particularly, to a compliant seal assembly for a gas turbine engine and method of operating.

Seal assemblies are known to seal between chambers having different pressures and thereby preventing or minimizing leakage from the high pressure chamber to the low pressure chamber. Some seal assemblies are generally connected to a first structure and seal to a second structure, and must generally compensate for movement between the first and second structures (i.e. compliancy). In such applications, known seal assemblies may generally be compliant in a singular direction such as an axial direction, or may be compliant in a radial direction but not both. Moreover, the degree of compliancy for known seal assemblies is limited, thus known seal assemblies may still undesirably transmit loading between the first and second structures and/or may undesirably leak with excessive motion between the structures.

SUMMARY

A compliant seal assembly according to one, non-limiting, embodiment of the present disclosure includes a housing orientated about an axis with a circumferentially extending groove in the housing opened radially outward; an annular carrier constructed and arranged to move radially within the groove, and with a circumferentially extending channel in the carrier opened radially outward; and a piston ring located in the channel.

Additionally to the foregoing embodiment, the housing includes a circumferential surface facing radially outward and defining in-part the groove, and the carrier includes a circumferential face spaced from and opposing the circumferential surface.

In the alternative or additionally thereto, in the foregoing embodiment, the carrier is constructed and arranged to move axially within the groove.

In the alternative or additionally thereto, in the foregoing embodiment, an axial length of the circumferential surface is greater than an axial length of the circumferential face.

In the alternative or additionally thereto, in the foregoing embodiment, the assembly includes a ring-shaped seal disposed in the groove, wherein the housing includes a first radial surface facing axially and disposed at least in-part in the groove, and the carrier includes a first radial face opposing the first radial surface, and the seal is in sealable contact between the first surface and the first face.

In the alternative or additionally thereto, in the foregoing embodiment, the housing includes a second radial surface opposite the first radial surface, and the carrier includes a second radial face opposite the first radial face, and wherein the second radial surface and the second radial face are opposed to and axially spaced from one-another.

In the alternative or additionally thereto, in the foregoing embodiment, the seal is disposed at least in-part in a seal channel defined by the first radial face.

In the alternative or additionally thereto, in the foregoing embodiment, a cavity is separated from a chamber by the compliant seal assembly and the cavity has a pressure greater than the chamber producing an axial force that biases the carrier axially against the housing for sealing contact.

In the alternative or additionally thereto, in the foregoing embodiment, the assembly includes a body including a bore, wherein the piston ring is disposed in the bore and is in axial sliding and sealing contact with the body.

In the alternative or additionally thereto, in the foregoing embodiment, the body is a mid-turbine frame of a turbine engine.

A seal assembly according to another, non-limiting, embodiment includes a housing centered to an axis and with a groove in the housing opened radially outward; an annular carrier projecting radially outward from the groove; a piston ring seated in and projecting radially outward from the carrier; and an annular seal disposed between and in axial sealing contact with the housing and the carrier.

Additionally to the foregoing embodiment, the assembly includes a cylindrical wall facing radially inward, wherein the piston ring is in sealing contact with the cylindrical wall.

In the alternative or additionally thereto, in the foregoing embodiment, the cylindrical wall is carried by a mid-turbine frame of a turbine engine.

In the alternative or additionally thereto, in the foregoing embodiment, the housing includes a circumferential surface facing radially outward and defining in-part the groove, and the carrier includes a circumferential face spaced from and opposing the circumferential surface, and wherein a radial distance measured between the circumferential surface and circumferential face is greater than a radial distance measured between the cylindrical wall and the housing.

In the alternative or additionally thereto, in the foregoing embodiment, the annular seal is a rope seal.

In the alternative or additionally thereto, in the foregoing embodiment, the assembly includes a fastener for axially connecting first and second segments of the housing together, wherein the first and second segments each define in-part the groove.

In the alternative or additionally thereto, in the foregoing embodiment, the first and second segments are generally cylindrical.

A method of operating a seal assembly according to another, non-limiting, embodiment includes the steps of axially deflecting a housing of the seal assembly with respect to a body; axially sliding a piston ring along a cylindrical wall carried by the body; radially deflecting the housing with respect to the body; and radially sliding a carrier with respect to the housing, wherein the piston ring is seated in the carrier that is movable supported by the housing.

Additionally to the foregoing embodiment, the method includes the step of axially sealing the carrier against the housing when a pressure in a cavity is greater than a pressure in a chamber with the cavity and the chamber being separated by the seal assembly.

In the alternative or additionally thereto, in the foregoing embodiment, sealing between the carrier and the housing is facilitated with a seal disposed axially between the housing and the carrier.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
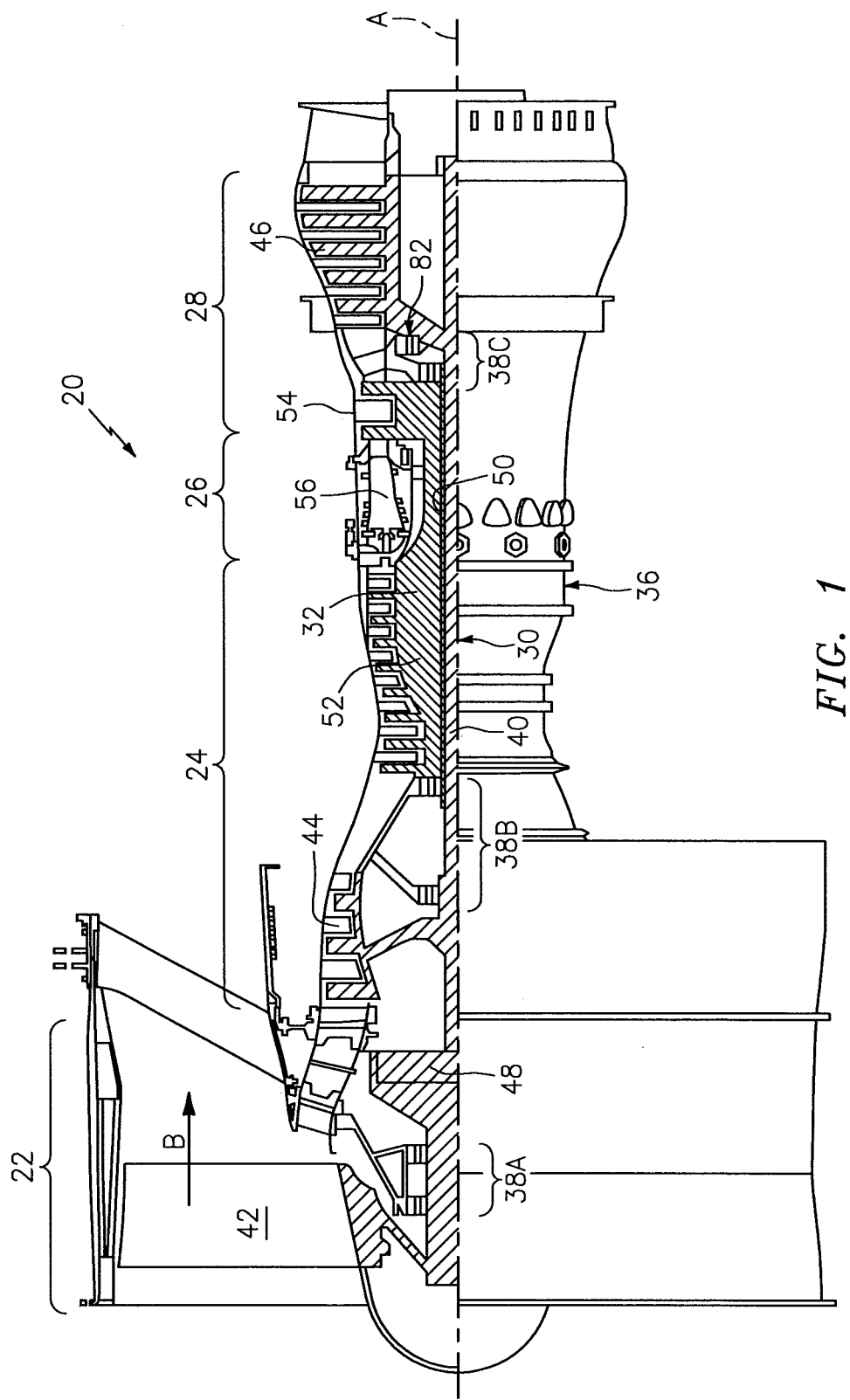
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38A, 38B, 38C and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
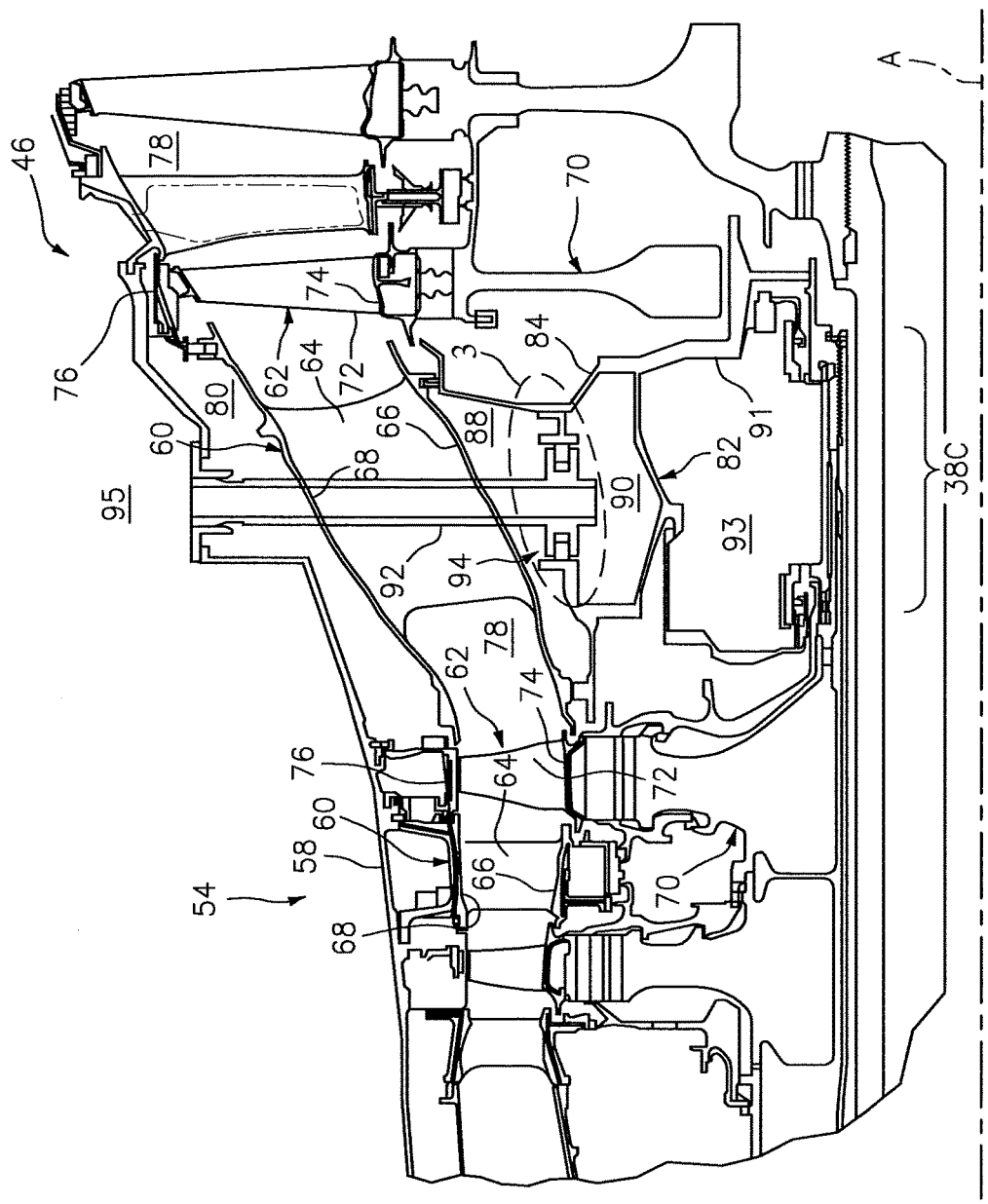
FIG. 2 is partial cross section of a turbine section of the gas turbine engine utilizing a seal assembly of the present disclosure.

Referring to FIG. 2, a portion of the LPT 46 and HPT 54 of the turbine section 28 is illustrated as one, non-limiting, application of the present disclosure. Both the LPT 46 and HPT 54 are generally surrounded by a radially outer casing 58, and each have a plurality of stages, with each stage having an upstream stator assembly 60 and an adjacent downstream rotor assembly 62. The stator assembly 60 includes a plurality of circumferentially spaced vanes 64 with each vane spanning radially between inner and outer platforms or endwalls 66, 68 in a ring-shaped formation about the axis A. The rotor assembly 62 includes a rotor disc 70, a plurality of circumferentially spaced blades 72 spanning radially outward from a platform or endwall 74, and a ring-shaped spacer 76 spanning axially between the outer platforms 68 of the vanes 64. The rotor disc 70 spans radially and is engaged between the platforms and the respective inner and outer shafts 40, 50 for the respective LPT 46 and HPT 54.

The vanes 64 and blades 72 are in an annular core flowpath 78 defined radially outward by the outer platforms 68 of the multiple stator assemblies 60 and the spacers 76 of the multiple rotor assemblies 62, and radially inward by the inner platforms of the stator assemblies 60 and the platforms 74 of the rotor assemblies 62. Hot combustion gases flow through the turbine section 28 where energy is extracted and turned to work through the rotation of the rotor discs 70 and shafts 40, 50 (see FIG. 1). A generally annular, outer, cooling air plenum 80 has a radially outward boundary that may generally be defined by the casing 58, and a radially inward boundary that may be defined by the outer platforms 68 of the stator assemblies 60 and the spacers 76 of the rotor assemblies 62. Cooling air may flow through the air plenum 80 to cool, as one non-limiting example, the vanes 64 and surrounding structure. A generally annular, inner, cooling air plenum (not illustrated) generally has a radially outward boundary that may be defined by the inner platforms 66 of the stator assemblies 60 and the platforms 74 of the rotor assemblies 62, and a radially inward boundary that may be defined by a variety of structures that support multiple seals for generally sealing between static and rotating parts. Cooling air may flow through the inner cooling air plenum to generally cool the vanes 64, blades 72 and surrounding structures.

Generally located axially between the LPT 46 and HPT 54 is a mid-turbine frame (MTF) 82 that may be designed to center the bearing structure 38C to the engine casing 58 and transfer engine operating loads from the bearing structure 38C and to the engine casing 58. The MTF 82 may include a body or inner casing 84 orientated radially outward from and engaged to the bearing structure(s) 38C (e.g. the number four bearing). The inner casing 84 may, at least in-part, be spaced radially inward from the endwall 66 of the MTF 82 (i.e. first stage stator assembly 60 of the LPT 46) such that a generally annular shaped MTF cavity 88 is defined therebetween. The inner casing 84 may define a secondary chamber 90 (i.e. torque box chamber) that may be located radially inward of the MTF cavity 88. Walls of the inner casing 84 generally isolate the cavity 88 from the chamber 90. During engine operating conditions, air pressure within the MTF cavity 88 is typically greater than air pressure within the secondary chamber 90.

The bearing structure 38C may include a casing 91 that generally defines a boundary of a bearing chamber 93 that may contain an oil for bearing lubrication. The bearing chamber 93 is generally isolated from the secondary chamber 90 via the casing 91 of the bearing structure 38C and/or the inner casing 84 of the MTF 82. Because the air temperature within the secondary chamber 90 is lower than the air temperature within the MTF cavity 88, the secondary chamber 90 acts as a buffer between the cavity 88 and chamber 93, and thereby assists in keeping the oil within the bearing chamber 93 relatively cool.

The MTF 82 may be associated with a conduit or tube 92 that may provide a direct communication between an environment 95 located radially outward from the engine casing 58 and the secondary chamber 90. The tube 92 may thus provide atmospheric ventilation for the chamber 90 and/or may provide a means to flow fluids to the bearing structure 38C such as, for example, oil and/or cooling air. The tube 92 may extend between and may be engaged (e.g. bolted) to the engine casing 58 and in sealing relationship with the inner casing 84. More specifically, the tube 92 may generally extend radially, and through the casing 58, the air plenum 80, the outer platform 68 of the stator assembly 60 of the LPT 46 first stage, the engine core flowpath 78, the inner platform 66 of the stator assembly 60, the MTF cavity 88 and the inner casing 84. So as not to obstruct the core flowpath 78, a portion of the tube 92 may be routed through a vane 64 of the stator assembly 60.

Figure 3:
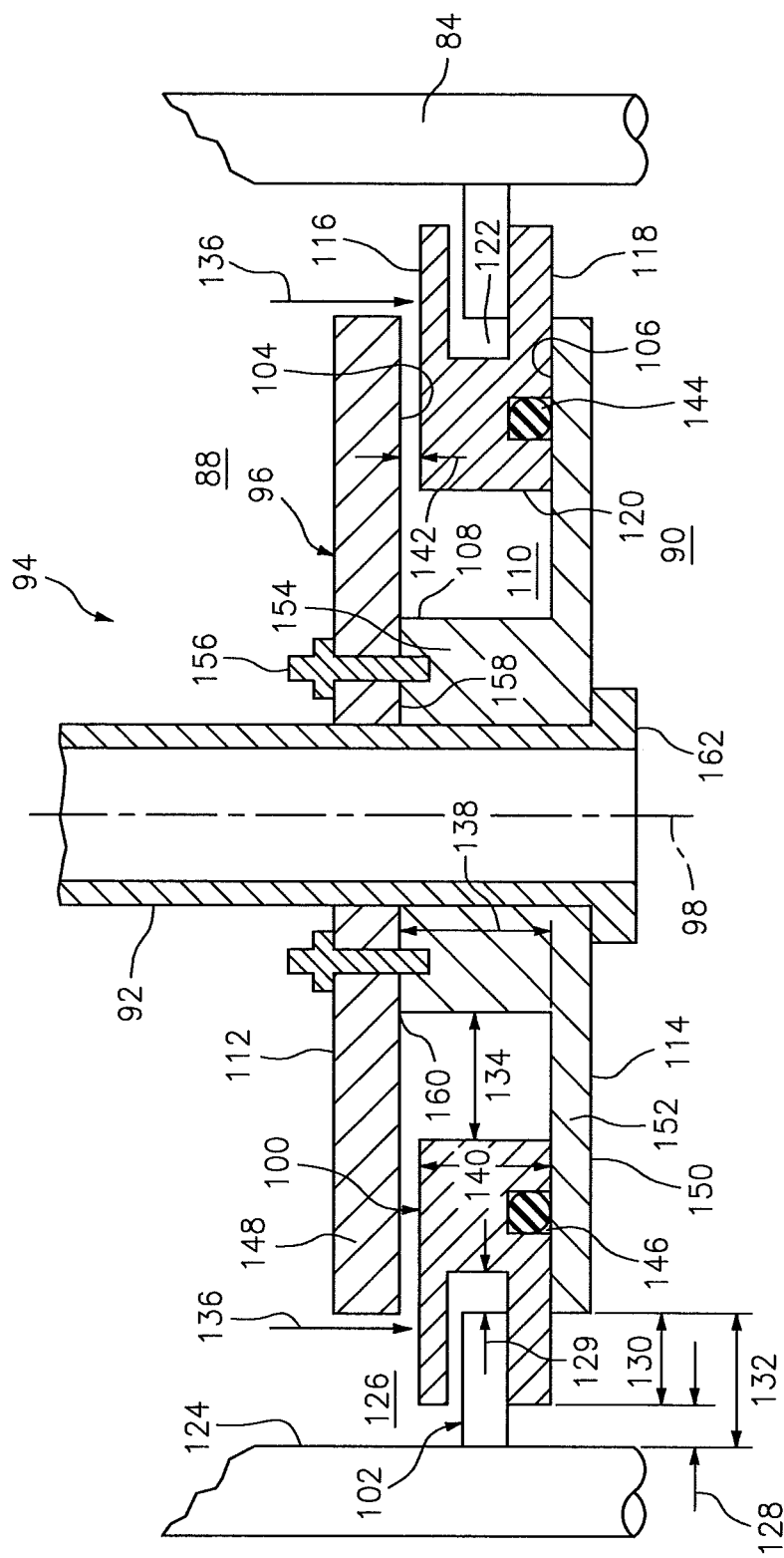
FIG. 3 is a partial cross section of a mid-turbine frame and the associated seal assembly taken from circle 3 in FIG. 2.

Referring to FIGS. 2 and 3, the MTF 82 is further associated with a compliant seal assembly 94 that generally connects and seals the tube 92 to the inner casing 84, while allowing for movement between the tube 92 (i.e. also the engine case 58) and the inner casing 84 and minimizing or preventing air leakage from the MTF cavity 88 and into the secondary chamber 90. The seal assembly 94 may include a housing 96 orientated about a central axis 98, an annular carrier 100, and a piston ring 102 capable of sealing against the inner casing 84. The tube 92 may extend between and is engaged rigidly to the casing 58 and the housing 96 of the seal assembly 94. Because the seal assembly 94 is compliant and thereby facilitates both axial movement and radial movement (with respect to axis 98) between the MTF 82 and the tube 92, the tube is generally not a load bearing structure (i.e. does not transmit a load between the engine casing 58 and the inner casing 84). Although not illustrated, tie rods may rigidly extend between and may be engaged to the engine casing 58 and the inner casing 84 of the MTF 82 to facilitate proper alignment, support and load transfer of the MTF 82 and/or bearing structure 38C to the engine casing 58.

It is contemplated and understood that the compliant seal assembly 94 may have a variety of applications with or without the tube 92, and is not limited to the MTF 82. For instance, the inner casing 84 may be any number of bodies that generally separate and isolate a chamber from a cavity that may have a pressure differential therebetween. Moreover, the chamber 90 and/or the cavity 88 may not contain air, but may be any variety of fluids. It is further contemplated that the chamber 90 or the cavity 88 may be an atmospheric environment.

The housing 96 includes opposing radial surfaces 104, 106 that each span radially outward with respect to axis 98; and, a circumferential surface 108 that may be substantially cylindrical, faces radially outward, and extends axially between the opposing radial surfaces 104, 106. The radial surfaces 104, 106 and the circumferential surface 108, together, define an annular groove 110 in the housing 96 that is opened radially outward. The housing 96 further includes opposite sides 112, 114 that face in substantially opposite axial directions with respect to axis 98. The first side 112 may define in-part the cavity 88 and the second side 114 may define in-part the chamber 90. The radial surface 106 may face in substantially the same axial direction as the first side 112 and the radial surface 104 may face in substantially the same axial direction as the second side 114.

The carrier 100 may be generally annular in shape and is movably seated in the groove 110 of the housing 96. The carrier 100 includes opposite radial faces 116, 118 that each span radially with respect to axis 98; and, a circumferential face 120 that may be substantially cylindrical, opposes the circumferential surface 108 of the housing 96, and extends axially between the opposite radial faces 116, 118. An annular channel 122 in the carrier 100 is opened radially outward for receipt of the piston ring 102 which slideably seals to a substantially cylindrical wall 124 carried by the inner casing 84. Wall 124 faces radially inward and defines a bore 126 that may contain at least a portion of the assembly 94. The piston ring 102 may be circumferentially split and may generally ride within the carrier 100 allowing for some radial movement between the carrier and the piston ring as is generally known by those skilled in the piston ring art.

The piston ring 102 projects radially outward from the carrier 100 by a gap or distance (see arrow 128) measured between an outer peripheral sealing surface of the ring 102 and the wall 124. An opposite inner peripheral surface of the ring 102 is spaced from the bottom of the channel 122 by a radial clearance (see arrow 129). Clearance 129 may be greater than distance 128 to prevent the ring 102 from bottoming-out against the carrier 100, which could cause undesirable ring distortion and possible seal failure. Moreover, the distance 128 may prevent the carrier 100 from rubbing against the wall 124, and is generally minimized to maintain the structural integrity of the piston ring seat to the carrier 100.

Similarly, the carrier 100 may project radially outward from the housing 96 by a distance (see arrow 130), which may be substantially greater than the distance 128 when the carrier 100 is centered to axis 98. The projecting distance 128 of the piston ring 102 plus the projecting distance 130 of the carrier 100 may be substantially equal to a gap or radial distance (see arrow 132) between the wall 124 and the housing 96. The distance 132 may be slightly less than a radial distance (see arrow 134) measured between the circumferential surface 108 of the housing 96 and the circumferential face 120 of the carrier 100 when the housing and carrier are centered to axis 98. Because distance 132 is less than distance 134, the carrier 100 is prevented from bottoming-out against the housing 96, thereby preventing undesirable load transfers between the housing and the carrier. Furthermore, distance 128 may be less than distance 134 to prevent the carrier 100 from contacting the wall 124 of the inner casing 84, and thereby preventing any undesirable load transfers between the carrier 100 and the wall 124.

During seal assembly 94 operation, and because distance 132 may be less than distance 134, the carrier 100 is prevented from rubbing against the wall 124 even when the carrier 100 shifts radially with respect to the housing 96. That is, and during a maximum radial-shifted state of the assembly 94, the face 120 of the carrier 100 will remain spaced from the surface 108 of the housing 96 even if a circumferential portion of the housing 96 contacts a portion of the wall 124 of the inner casing 84 (not illustrated). Even at this location where the housing 96 has shifted radially such that the housing contacts the wall 124, the ring 102 remains spaced from the bottom of the channel 122 of the carrier 100.

The carrier 100 may be constructed and arranged to move slightly axially to minimize any frictional resistance toward radial movement of the carrier 100 with respect to the housing 96. For instance and during seal assembly 94 operation, the pressure differential between the cavity 88 and the chamber 90 creates an axial force (see arrow 136) upon the carrier 100 that generally biases the face 118 of the carrier 100 toward the surface 106 of the housing 96 creating a sealing interface therebetween while permitting radial movement between the housing 96 and the carrier 100. This sliding characteristic of the sealing interface between the face 118 and surface 106 may be promoted via the addition of a friction reducing coating, lubrication, or polishing of surface 106 and/or face 118. Furthermore, and to prevent friction and/or binding between the radial surface 104 of the housing and the radial face 116 of the carrier 100, an axial length (see arrow 138) of the circumferential surface 108 of the housing 96 may be greater than an axial length (see arrow 140) of the circumferential face 120 of the carrier 100, thus creating a gap (see arrow 142) between the face 116 and the surface 104.

The seal assembly 94 may further include a ring-shaped seal 144 generally located between the radial surface 106 of the housing 96 and the radial face 118 of the carrier 100. The seal 144 may be seated in a circumferentially continuous channel 146 in the carrier 100 and defined by the radial face 118. Alternatively, the channel 146 may be in the housing 96 and defined by the radial surface 106 (not illustrated). Use of the seal 144 further promotes the prevention of air leakage from the cavity 88 to the chamber 90. The seal 144 may be a rope seal or an O-ring, and made of a resiliently compressible material that is generally chosen based on surrounding temperature and the expected differential pressure between the cavity 88 and the chamber 90. Non-limiting examples of seal material may include rubber, nextel fiber and metal.

To facilitate manufacturing and maintenance of the seal assembly 94, the housing 96 may be divided into two axially separate segments 148, 150. The first segment 148 may generally be a disc or plate that carries the side 112, the second segment 150 may have a disc portion 152 that carries the side 114 of the housing 96 and a concentrically located boss 154 that carries the circumferential surface 108. The boss 154 is concentrically engaged to the first segment 148 via a plurality of fasteners 156 that may be threaded bolts. An interface or seam 158 between the boss 152 and first segment 148 has an outer periphery 160 that is generally exposed within the groove 110. During assembly of the seal assembly 94 and when the segments 148, 150 are axially separated, the carrier 100 may be seated within the groove 110 before the segment 148 is generally placed over the carrier 100, axially upon the boss 154, and secured with the fasteners 154. It is further contemplated and understood that the periphery 160 of the seam 158 may generally be located anywhere along the surface 108 without inhibiting installation of the carrier 100 during assembly.

The tube 92 extends concentrically through the segment 148, the boss 154 and the disc portion 152 of the second segment 150 to provide direct fluid communication between the chamber 90 and the environment 95 located radially outside of the casing 58 (with respect to engine axis A). An end flange 162 of the tube 92 may be rigidly engaged to the disc portion 152. It is further contemplated and understood that the tube 92 may be rigidly engaged to the first segment 148 and/or the flange 162 may generally be attached at the seam 158 (i.e. 'sandwiched' between the segment 148 and the boss 154). With such an orientation, the segment 148, boss 154 and disc portion 152 may each define a centrally located bore (not shown) that provides, in-part, the fluid communication between the chamber 90 and environment 95 located radially outward from the casing 58.

Figure 4:
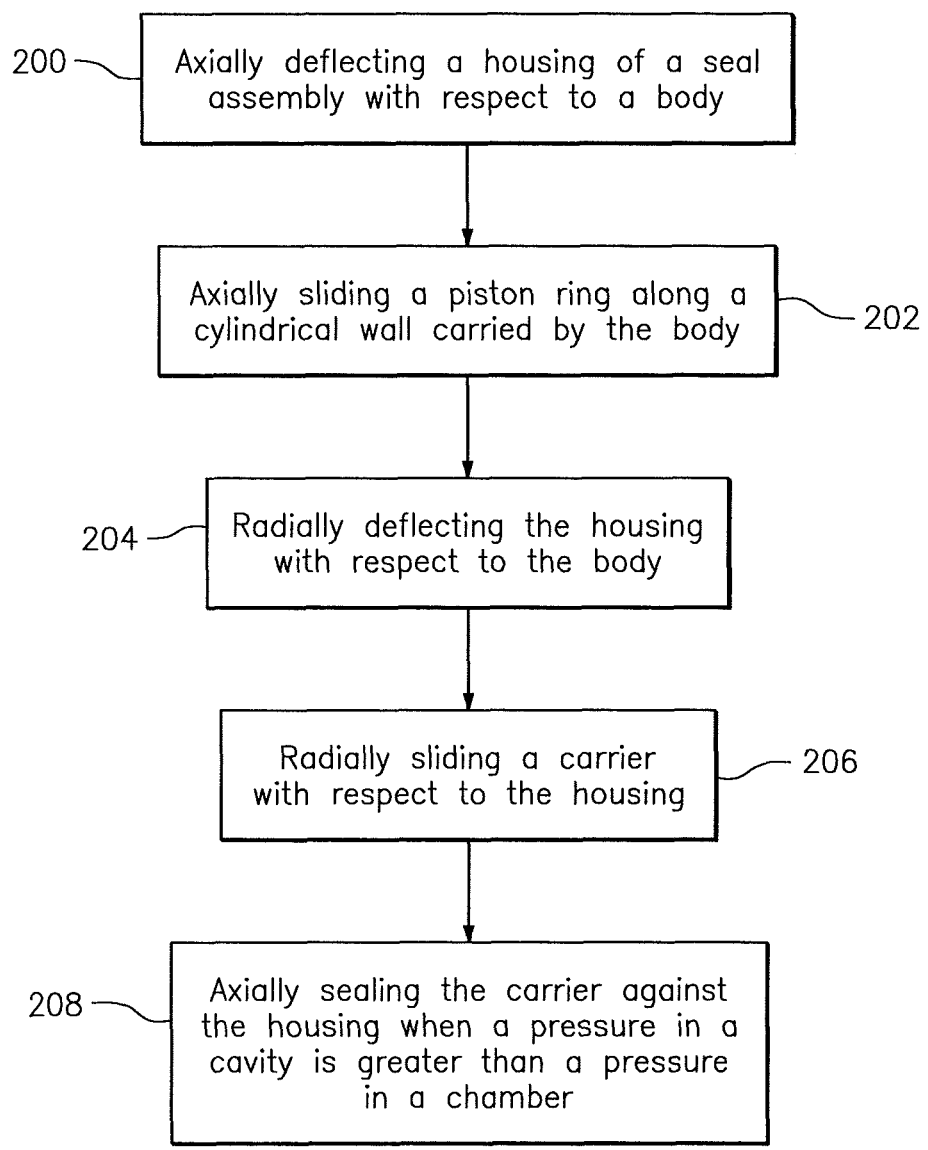
FIG. 4 is a flow chart of a method of operating the seal assembly.

Referring to FIG. 4, a method of operating the seal assembly 94 may include a first step 200 of axially deflecting the housing 96 of the seal assembly 94 with respect to the body 84. A second step 202 may include axially sliding a piston ring 102 along a cylindrical wall 124 carried by the body 84 in response to the axial displacement. As a third step 204 that may occur in unison with the first and second steps 200, 202, the housing 96 may be radially deflected with respect to the body 84. A fourth step 206 may include radially sliding the carrier 100 with respect to the housing 96 in response to the radial displacement and with the piston ring 102 seated in the carrier 100 that is movable supported by the housing 96. A fifth step 208 that may generally occur at any time may include axially sealing the carrier 100 against the housing 96 when a pressure in the cavity 88 is greater than a pressure in the chamber 90 with the cavity and the chamber being separated by the seal assembly 94.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

What is claimed is:

1. A turbine engine system comprising:
a compliant seal assembly;
a mid-turbine frame that includes a body; and
a wall carried by the body, where the wall defines a bore that contains at least a portion of the complaint seal assembly,
wherein the compliant seal assembly includes
a housing orientated about an axis with a circumferentially extending groove in the housing opened radially outward;
an annular carrier constructed and arranged to move radially within the groove, and with a circumferentially extending channel in the carrier opened radially outward;
a piston ring located in the channel and radially and axially movable in the channel; and
a ring shaped seal disposed in the groove and for sealing between the carrier and the housing,
wherein the housing includes a first radial surface facing axially and which forms at least part of the groove, and the carrier includes a first radial face opposing the first radial surface, and the seal is in sealable contact between the first surface and the first face,
wherein the housing includes a second radial surface opposite the first radial surface, and the carrier includes a second radial face opposite the first radial face, and wherein the second radial surface and the second radial face are opposed to and axially spaced from one-another,
wherein the housing includes a circumferential surface that extends between the first radial surface and the second radial surface,
wherein the carrier includes a circumferential face that that extends between the first radial face and the second radial face,
wherein the wall and the housing are separated from one another by a first radial distance,
wherein the circumferential surface and the circumferential face are separated from one another by a second radial distance, and
wherein the first radial distance is less than the second radial distance to prevent the carrier from bottoming-out against the housing.

2. The system set forth in claim 1, wherein the circumferential surface faces radially outward and defines in-part the groove.

3. The system set forth in claim 2, wherein the carrier is constructed and arranged to move axially within the groove.

4. The system set forth in claim 3, wherein an axial length of the circumferential surface is greater than an axial length of the circumferential face.

5. The system set forth in claim 1, wherein the seal is disposed at least in-part in a seal channel defined by the first radial face.

6. The system set forth in claim 1, wherein the complaint seal assembly separates a cavity from a chamber and the cavity has a pressure greater than the chamber thus producing an axial force that biases the carrier axially against the housing for sealing contact.

7. The system set forth in claim 1
wherein the piston ring is disposed in the bore and is in axial sliding and sealing contact with the body.

8. The system set forth in claim 1, wherein the seal is a rope seal.

9. The seat system set forth in claim 1 further comprising:
a fastener for axially connecting first and second segments of the housing together, wherein the first and second segments each define in-part the groove.

10. The system set forth in claim 9, wherein the first and second segments are generally cylindrical.

11. A turbine engine system comprising:
an assembly;
a frame that includes a body; and
a wall carried by the body, where the wall defines a bore that contains at least a portion of the assembly,
wherein the assembly includes;
a housing orientated about an axis with a circumferentially extending groove in the housing opened radially outward;
a carrier constructed and arranged to move within the groove, and with a circumferentially extending channel in the carrier opened radially outward;
a piston ring located in the channel and radially and axially movable in the channel; and,
a ring-shaped seal disposed in the groove, and for sealing between the carrier and the housing,
wherein the housing includes a first radial surface facing axially and which forms at least part of the groove, and the carrier includes a first radial face opposing the first radial surface,
wherein the housing includes a second radial surface opposite the first radial surface, and the carrier includes a second radial face opposite the first radial face, and wherein the second radial surface and the second radial face are opposed to and axially spaced from one-another,
wherein the housing includes a circumferential surface that extends between the first radial surface and the second radial surface,
wherein the carrier includes a circumferential face that that extends between the first radial face and the second radial face,
wherein the wall and the housing are separated from one another by a first radial distance,
wherein the circumferential surface and the circumferential face are separated from one another by a second radial distance, and
wherein the first radial distance is less than the second radial distance to prevent the carrier from bottoming-out against the housing.

* * * * *